United States Patent [19]

Komatsu et al.

[11] Patent Number: 4,992,891
[45] Date of Patent: Feb. 12, 1991

[54] DUAL RECORD/READ HEAD VIDEO RECORDING AND PLAYBACK APPARATUS WITH FADE-IN FUNCTION

[75] Inventors: Keiichi Komatsu, Katsuta; Shinji Ozaki, Funabashi; Shigeyuki Itoh, Yokohama; Hikaru Masui, Ashiya; Yoshizumi Watatani, Fujisawa, all of Japan

[73] Assignee: Hitachi, Ltd., Tokyo, Japan

[21] Appl. No.: 303,749

[22] Filed: Jan. 27, 1989

[30] Foreign Application Priority Data

Jan. 29, 1988 [JP] Japan .................. 63-17040

[51] Int. Cl.⁵ ............................................ H04N 5/782
[52] U.S. Cl. .................................................. 360/14.3
[58] Field of Search ............... 358/182, 183, 311, 314; 360/13, 14.1, 14.2, 14.3, 33.1, 106, 107, 72.2, 15, 35.1, 18, 19.1; 364/3, 83, 84

[56] References Cited

U.S. PATENT DOCUMENTS

| | | | |
|---|---|---|---|
| 4,593,392 | 6/1986 | Kouyama | 358/314 |
| 4,706,135 | 11/1987 | Kojima | 360/14.1 |
| 4,796,105 | 1/1989 | Mawatari | 360/14.1 |
| 4,858,033 | 8/1989 | Chippendale | 360/72.2 |

FOREIGN PATENT DOCUMENTS 62-78978  6/1986  Japan .

OTHER PUBLICATIONS

INPADOC Abstract of Japanese Application No. 62-78978.

Primary Examiner—Donald McElheny, Jr.
Attorney, Agent, or Firm—Fay, Sharpe, Beall, Fagan, Minnich & McKee

[57] ABSTRACT

A pair of recording heads are mounted on a rotary cylinder for recording a video signal in slanted tracks on magnetic tape. The recording heads are mounted in a common plane and each has a different azimuthal angle. A pair of reading heads are mounted on the same rotary cylinder for reading the video signal recorded on the magnetic tape. The reading heads are mounted in a plane offset from the plane of the recording heads and have azimuthal angles that match the azimuthal angles of the recording heads. A mixing circuit mixes a component of the video signal ready from the magnetic tape by one of the recording heads with a video signal from a video signal source to generate a mixed video signal. The mixed video signal is returned to one of the recording heads for recordation on the magnetic tape.

3 Claims, 15 Drawing Sheets

TAPE TRANSPORT

SPLICE PERIOD

DUAL RECORD/READ HEAD VIDEO RECORDING AND PLAYBACK APPARATUS WITH FADE-IN FUNCTION

BACKGROUND OF THE INVENTION

1. Field of the Invention

The present invention relates to a magnetic recording and playback apparatus and more particularly to a magnetic and playback system suitable for providing dissolving views, or splicing, not giving a feeling of unnaturalness when applied to a VTR incorporating a camera.

2. Description of the Prior Art

In performing the splicing in the prior art VTR incorporating a camera, it was practiced, as stated in Japanese Laid-open Patent Publication No. 62-78978, to maintain the camera in its recording state for a predetermined short period, and the video signal was gradually reduced to the black level before the camera stopped. Therefore, there was produced a signal dropout at the spliced portion giving a feeling of unnaturalness. Hence such a prior art system was not sufficient to provide smoothly spliced pictures.

SUMMARY OF THE INVENTION

An object of the present invention is to provide a magnetic recording and playback system which overcome the difficulties in the prior art as above and will not cause any feeling of unnaturalness at the spliced portion.

In order to achieve the above mentioned object, the present invention comprises a read head arranged to be precedent to a write head, a memory for storing a read signal, and an adder for adding the read old signal and a new signal from a camera, and therein the old signal and the new signal are added and recorded in a recording medium while the levels of these signals are being changed.

The old signal already recorded at the time of splicing is read out by the precedent read head, the read out old signal is once stored in the memory and, after a predetermined delay time, output from the memory synchronized with the video signal input from a video signal input terminal. The output signal from the memory and the video signal from the input terminal are added up and written on a recording medium by the write head while their signal levels are being changed.

Thereby, an image of the sum signal of the old signal and the new signal is formed in the spliced portion, such that, at the beginning of the spliced portion, the level of the new signal is small and that of the old signal accounts for most of the added signal level, but with the lapse of time, the level of the new signal is progressively elevated while that of the old signal lowered, and at the end of the spliced portion, most of the added signal level comes to be occupied by the new signal. Hence, when such a signal is played back, so-called cross-fade with the old signal gradually replaced by the new signal is effected and thereby spliced views without giving any feeling of unnaturalness can be obtained.

DESCRIPTION OF THE PREFERRED EMBODIMENTS

Figure 1:
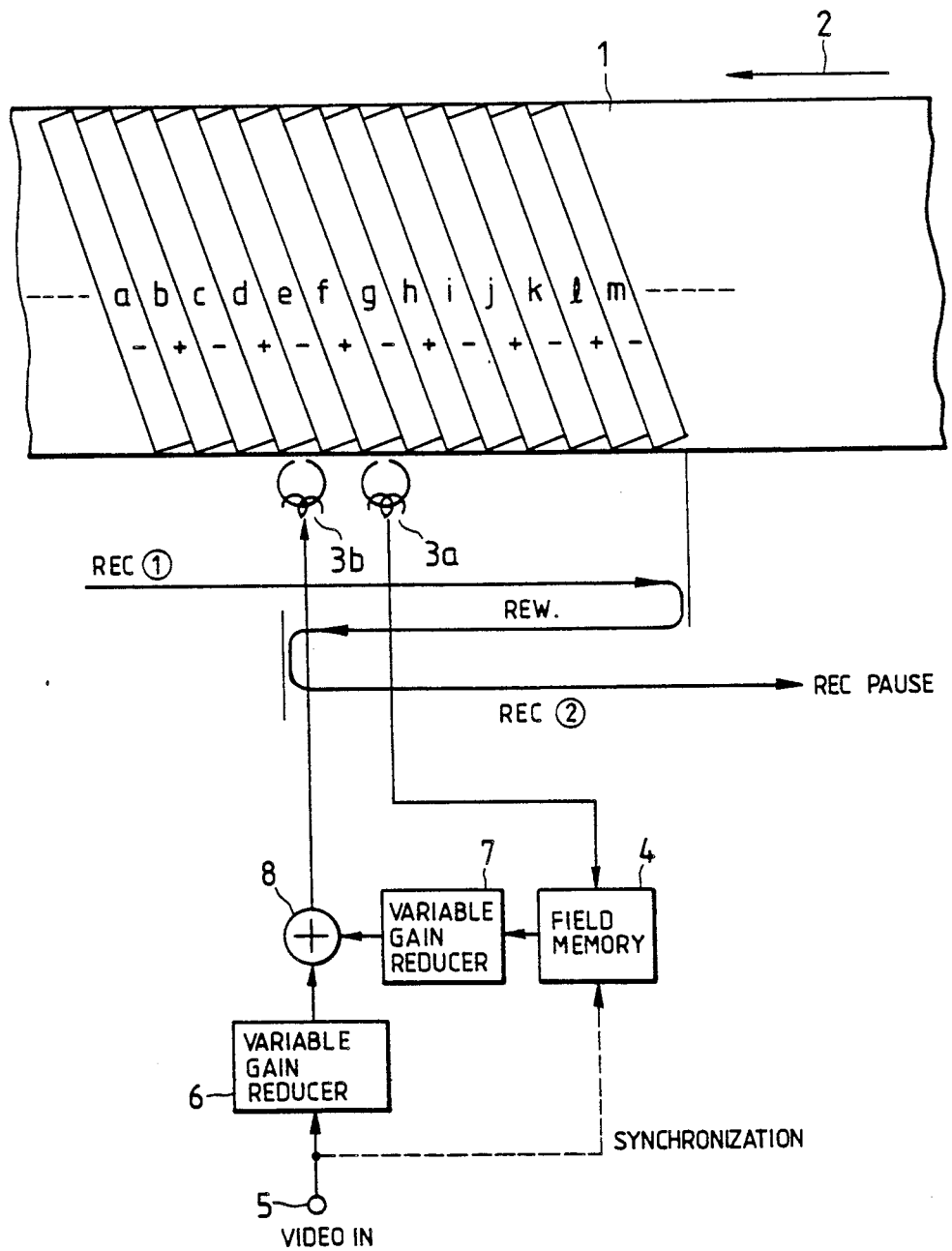
FIG. 1, FIG. 5, and FIG. 6 are system block diagrams showing an embodiment of the present invention.

Referring to FIG. 1, reference numeral 1 denotes a magnetic tape as a recording medium, 2 denotes the tape traveling direction, 3 denotes a magnetic head (3a denotes a preceding read head and 3b denotes a write head), 4 denotes a field memory for storing one-field quantity of the video signal, 5 denotes an input terminal for inputting a video signal, 6 denotes a first variable gain reducer for reducing the input signal, 7 denotes a second variable gain reducer for reducing an output signal from the memory, and 8 denotes an adder.

In a normal recording mode, the magnetic head 3a does not operate but the magnetic head 3b writes tracks as indicated by (a) to (m) in FIG. 1. Suppose now that record has been progressively made in the tracks (a), (b), (c), . . . , and, when it is at the track (m), a pause button is pushed to cause a splice to be performed. Normally, when the pause button is pushed, the tape is rewound from that point by some tracks and stops at the track (d). This is done, firstly, for producing no signal dropout period between the old signal and new signal and, second, for providing a period for the servo to get stabilized. Hence, when the new signal is intended to be spliced to the old signal, the new signal is written by the magnetic head 3b starting at the track (d). At this time, there is stored in the field memory 4 the old signal of the track (f) which has previously been reproduced by the read head 3a. This old signal is output from the memory 4, in synchronism with the new signal input from the input terminal 5. Both the new signal and the old signal are changed in signal level in the variable gain reducers 6 and 7, respectively, added together in the adder 8, and then supplied to the write head 3b. Namely, in recording the new signal in splicing, the sum signal of the old signal and the new signal is written by the write head 3b during the splice period.

The above described operation is repeated when the write head 3b records the track (e), that is, the sum signal of the old signal in the track (g) and the new signal from the input terminal 5 becomes the signal recorded along the track (e). Similar operations to the above are performed for the track (f) and the subsequent tracks, and thus recording of the sum signal of the old signal and the new signal is carried out throughout the splice period.

Further, in order not to cause the feeling of unnaturalness at the spliced portion, it becomes necessary to fade in and fade out the new signal and the old signal in addition to the summing. In the case of FIG. 1, the variable gain reducers 6 and 7 produce these effects. That is, the reducers 6 and 7 control such that the new signal is weak and the old signal is much stronger at the starting point of the splice period, but with the lapse of time, the old signal gradually becomes weaker while the new signal becomes stronger, and at the end, the new signal comes to occupy most of the signal level. The variable gain reducers 6, 7 are structured, for example, of a pair of transistors whose emitters are connected in common and a third transistor connected as an electric current source to the emitters in common. In this configuration, the input signal is supplied to the base of the third transistor and the output signal is taken out from the collector of one of the pair of the transistors, while a D.C. voltage for controlling the gain is supplied to the base of the other transistor of the pair of transistors. The D.C. voltage increasing or decreasing with time is obtained from a part of a time constant circuit which is supplied with a fixed voltage at its one end.

According to the above described embodiment, the old signal is gradually replaced by the new signal, and thereby, the so-called cross-fade can be effected and spliced views without giving the feeling of unnaturalness can be obtained.

Now, the structure of the cylinder used in the present invention will be described with reference to FIG. 2 to FIG. 4.

Figure 2:
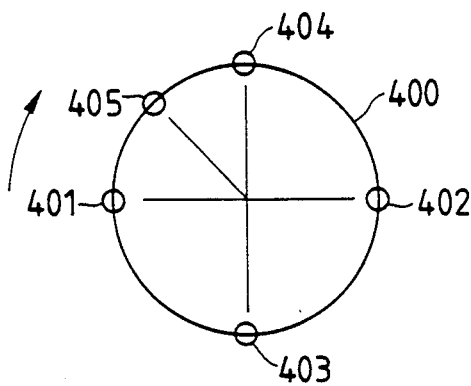
FIG. 2 is an arrangement drawing of heads on a rotary cylinder used in the present invention.
Figure 3:
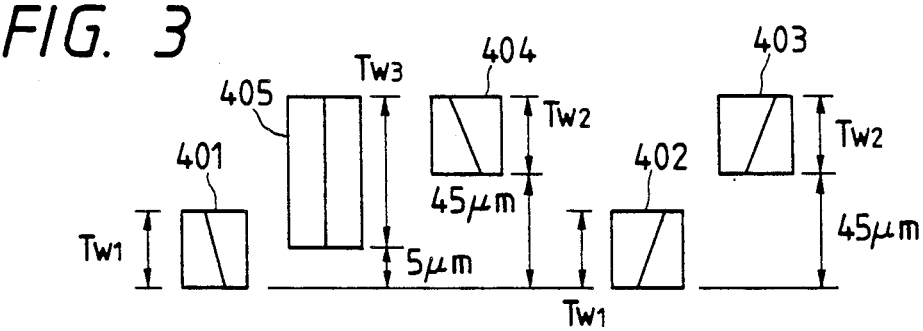
FIG. 3 is a diagram showing relations among axial offsets provided for the heads.

FIG. 2 shows the head arrangement on the rotary cylinder 400 in the embodiment of the present invention. On the rotary cylinder 400, there are arranged ordinary record/playback heads 401 and 402 opposite each other at intervals of 180°, and playback heads 403 and 404 are each arranged therebetween, or at an interval of 90° from either of them. An erase head 405 is arranged between the record/playback head 401 and the playback head 404 at an interval of 45° from either of them.

As for the offsets provided for the heads, when they are, for example, for use in an 8-mm video, the playback heads 403, 404 are elevated 45 μm above the record/playback heads 401, 402 which are at the lowest level, while the erase head 405 is elevated 5 μm above them. Track widths $TW_1$, $TW_2$, and $TW_3$ of the heads may preferably be $TW_1 \geq 20$ μm and $TW_2 \geq 20$ μm when the VTR is that used only in the standard recording mode, and $TW_1 = 15$ μm and $TW_2 = 17$ μm when the VTR is that used also in long-time recording mode, while the erase head 405 is given the track width $TW_3 = 40$ μm.

Figure 4:
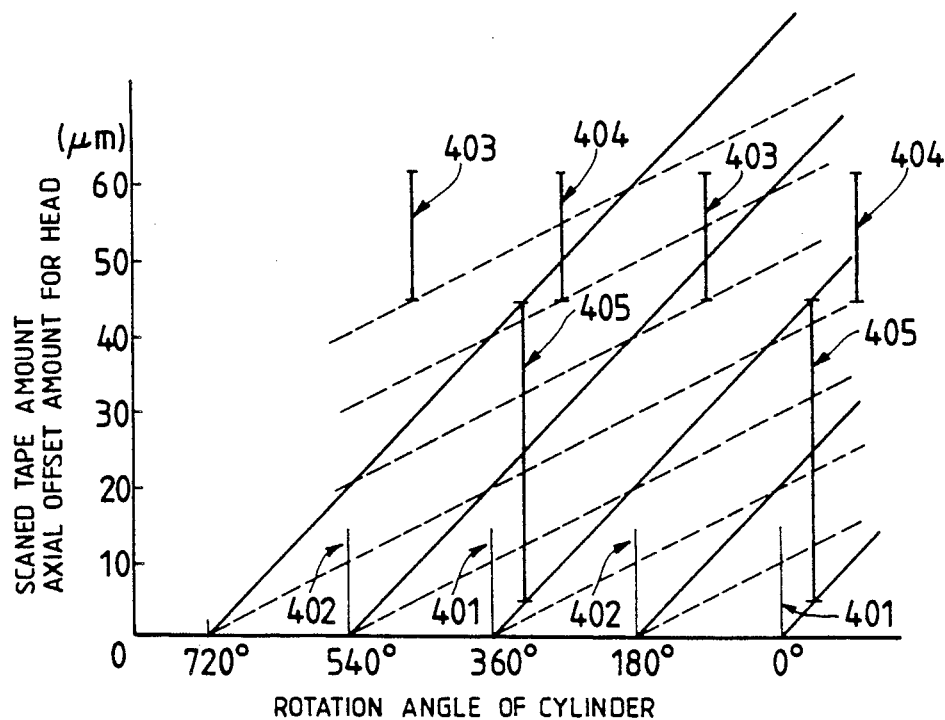
FIG. 4 is a diagram showing scanning loci of the heads.

FIG. 4 is a diagram for explaining the operation. Solid lines in the diagram indicate scanning loci in the standard recording mode and broken lines indicate scanning loci in the long-time recording mode.

A read signal by the playback head 404 is applied to the record head 401 through a memory. Then, the record head 402 receives a signal from the playback head 403, and these operations are repeated. The erase head 405 scans between the playback head 404 and the record head 401. In the standard recording mode, the erase head 405 erases two fields at a time along the solid lines in the diagram. In the long-time recording mode, it erases virtually four fields at a time along the broken lines in the diagram.

Here, a same azimuth angle is provided for the record head 401 and the playback head 404 and another same azimuth angle is provided for the record head 402 and the playback head 403. Hence the signal input from the playback head 404 to the record head 401 is transferred with a tape pattern in the same azimuth angle, and therefore, there is produced no slippage of the sync signal and read and write operations can be easily performed.

Figure 5:
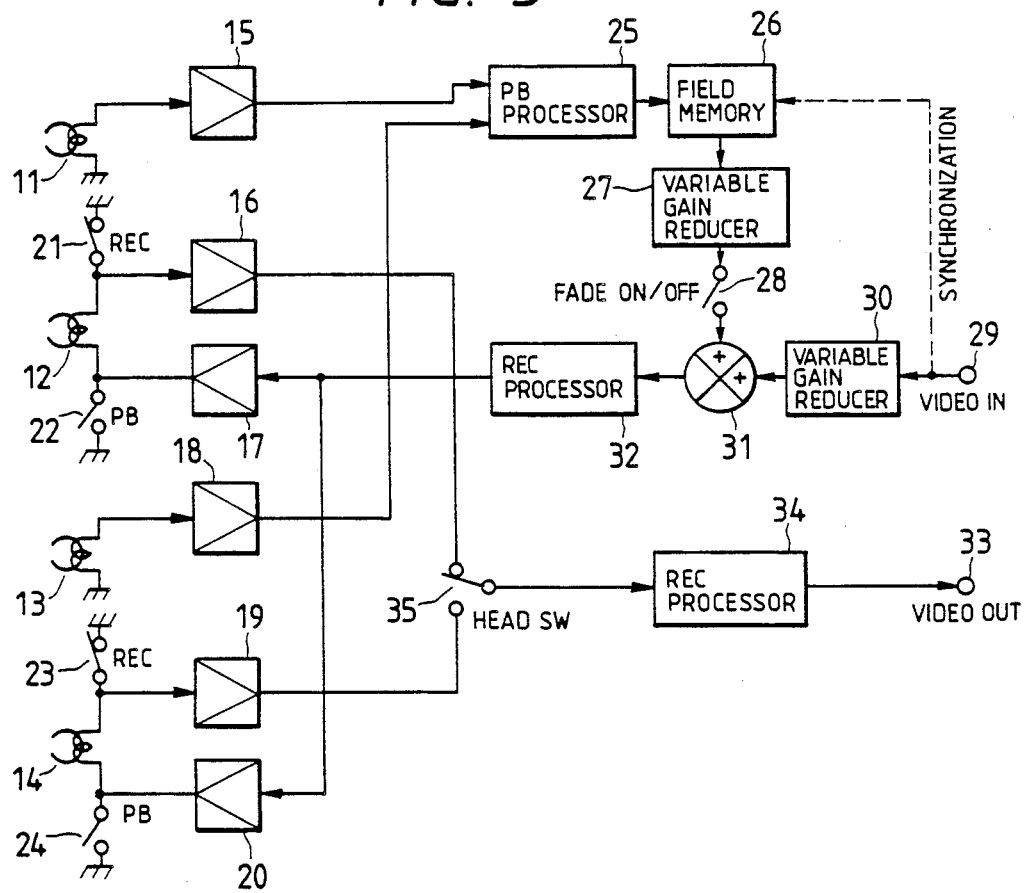

FIG. 5 is a system block diagram of the embodiment of the present invention.

Referring to FIG. 5, reference numerals 11 to 14 denote magnetic heads, 15, 16, 18, and 19 denote preamplifiers, 17 and 20 denote record amplifiers, 21 and 23 denote switches turned ON at the time of recording, 22 and 24 denote switches turned ON at the time of playback, 25 and 34 denote playback processors for demodulating a playback signal from the magnetic head into an original video signal, 26 denotes a field memory for storing a video signal, 27 and 30 denote variable gain reducers for lowering the level of a video signal, 28 denotes a switch for effecting cross-fade in a splice period, 29 denotes a video signal input signal, 31 denotes an adder of an old signal and a new signal, 32 denotes a record processor for encoding a video signal into a record signal, 33 denotes a video signal output terminal, and 35 denotes a head switch.

In FIG. 5, to effect cross-fade in a splice period, there are provided the play back heads 11, 13, preamplifiers 15, 18, playback processor 25, field memory 26, variable gain reducers 27, 30, cross-fade ON/OFF switch 28, and the adder 31.

At the time of normal recording, the switches 21 to 24 and 28 are in the positions as shown in the drawing, and the variable gain reducer 30 does not operate as the reducer but becomes "through". Hence, a video signal input from the input terminal 29 is directly processed by the record processor 32 and the record amplifier 17 or 20 to be recorded by the record head 12 or 14.

In a splice period, the switch 28 takes the opposite position to that indicated in the diagram and the variable gain reducer 30 operates and varies the gain according to a control signal. As described in FIG. 1, a signal reproduced by the preceding head 11 or 13 is demodulated into a video signal and stored in the field memory 26 temporarily. A new signal for splicing is input from the input terminal 29 and processed by the variable gain reducer 30 and input to the adder 31. Meanwhile, the field memory 26 outputs the old signal synchronized with the new signal. The output old signal is input to the adder 31 via the variable gain reducer 27 and the switch 28. The old signal and the new signal are added in the adder 31 and the sum signal is processed by the record processor 32 and the recording amplifier 17 or 20 to be written by the magnetic head 12 or 14. The gain reducing amounts of the variable gain reducers 27 and 30 are adapted to be of opposite characteristics during the splice period. That is, the amounts reduced are gradually changed such that, at the start, the variable gain reducer 27 is "through" and the variable gain reducer 30 effects a maximum amount of reduction and, at the end, the variable gain reducer 27 effects a maximum amount of reduction and the variable gain reducer 30 becomes "through".

Figure 6:
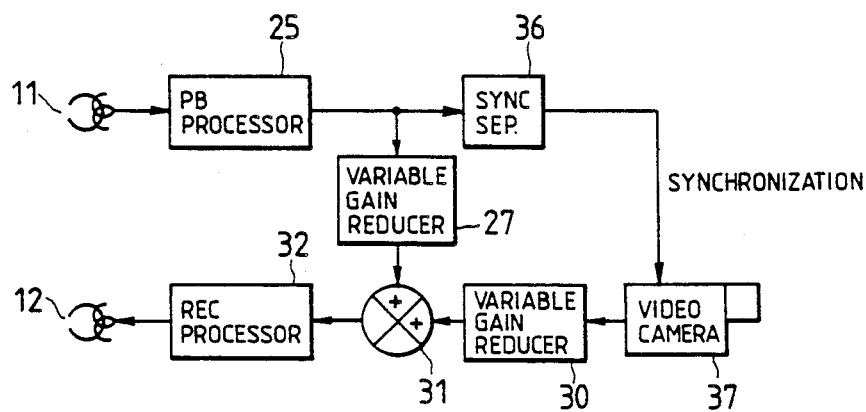

FIG. 6 is a diagram of the embodiment of FIG. 5 applied to a VTR incorporating a camera.

Referring to FIG. 6, reference numeral 36 denotes a sync separator and 37 denotes a camera. Other parts are corresponding to those in FIG. 5.

What is characteristic of FIG. 6 is that the video signal is made to be a signal from the camera and the field memory has been omitted.

At the time of normal recording, the playback processor 25, the variable gain reducer 27, and the sync separator 36 do not operate and the video signal from the camera is conducted "through" by the variable gain reducer 30 and recorded by the magnetic head 12.

In a splice period, a reproduced signal from the preceding head 11 is demodulated by the playback processor 25 into a video signal and it is input to the variable gain reducer 27. The reproduced old video signal is also input to the sync separator and only a sync signal therefrom is input to the camera 37. Since the camera is thus operated according to the sync signal of the old signal, the new signal from the camera can be put in synchronism with the old signal, thereby achieving the cross-fade as described in FIG. 5.

Below will be described another embodiment of a system, in which, when splicing is performed such that recording operation is temporarily stopped after one scene (picture image) has been taken (hereinafter to be called a REC pause state) and after a while another scene (picture image) is recorded in continuance, the scene of one field just before the REC pause state is stored, this stored picture is gradually faded out at the time the splicing is started, while a new picture is gradually faded in, and the former scene is lapped on (added to) the latter scene.

Figure 7:
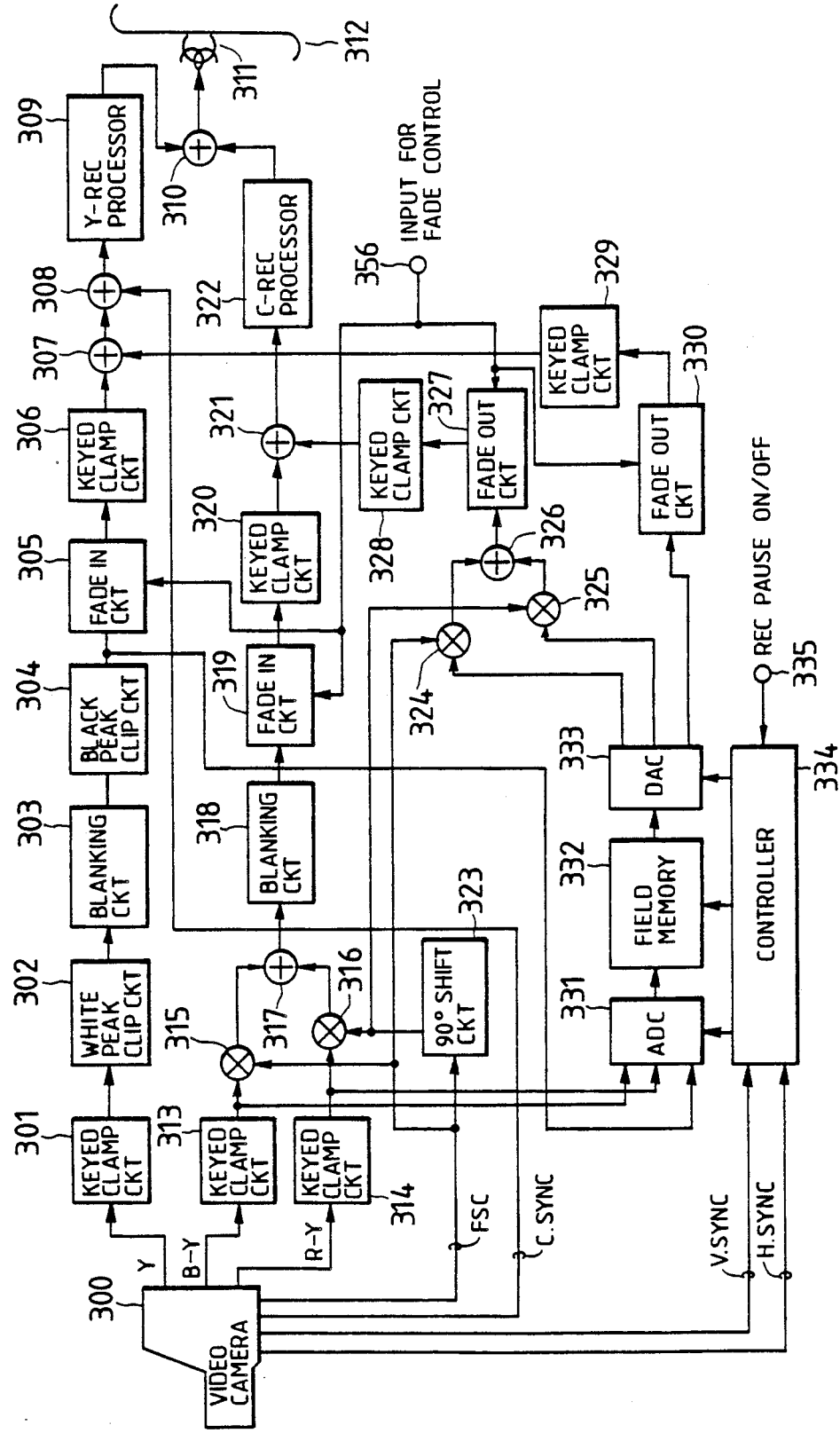
FIG. 7 and FIG. 8 are system block diagrams showing other embodiments of the present invention.

Referring to FIG. 7, reference numeral 300 denotes a camera outputting a luminance signal Y, color difference signals (R−Y signal, B−Y signal), a 3.58 MHz chroma subcarrier $f_{sc}$, a vertical sync signal V.Sync, a horizontal sync signal H.Sync, and a composite sync signal C.Sync, 301, 313, and 314 denote keyed clamp circuits for the luminance signal and the color difference signals, 302 denotes a white peak clip circuit, 303 and 318 denote blanking circuits for gating the signals during the blanking period, 304 denotes a black peak clip circuit, 305 and 319 denote fade-in circuits for fading in the luminance signal and the chroma signal at the time of splicing, 315, 316, 324, and 325 denote multipliers for balanced modulation of color difference signals into 3.58 MHz chroma signals, 317, 307, 308, 321, 310, and 326 denote signal adders, 306 and 329 denote keyed clamp circuits for the luminance signal, 320 and 328 denote keyed clamp circuits for the chroma signal, 327 and 330 denote fade-out circuit for fading out the luminance signal and the chroma signal reproduced from memory at the time of splicing, 323 denotes a 90° shift circuit, 331 denotes analog-to-digital converter (ADC), 332 denotes a field memory for storing digital data obtained from the ADC 331, 333 denotes a digital-to-analog converter (DAC), 334 denotes a controller for controlling the ADC 331, the field memory 332, and the DAC 333, 309 denotes a luminance signal record processor for the VTR made up of an FM modulator, an emphasis circuit, etc., 322 denotes a chroma signal record processor for the VTR made up of a frequency converter and others, 311 denotes a rotary magnetic head, and 312 denotes a magnetic tape.

Operation will be described below.

The luminance signal Y output from the camera 300 is clamped in the keyed clamp circuit 301 to a fixed potential level utilizing the blanking period and then its white level is limited in the white peak clip circuit 302. The output signal of the white peak clip circuit 302 is deprived of the unnecessary signal for the blanking period (brought to a fixed potential level) in the blanking circuit 303 and its black level is limited in the black peak clip circuit 304. The output signal of the black peak clip circuit 304 is, on one hand, input to the fade-in circuit for effecting the fade-in at the time of splicing and, on the other, input to the memory circuit made up of the ADC 331, field memory 332, DAC 333, and the controller 334 for storing one-field picture.

The fade-in circuit 305 as the splicing is started, when the transition from the REC pause state to the recording state takes place, gradually effects fade-in of the output signal of the black peak clip circuit 304 over approximately three seconds. The memory circuit made up of the ADC 331, field memory 332, DAC 333, and the controller 334, storing one-field picture immediately before the REC pause state, outputs the stored picture image to the fade-out circuit 330 with the start of the splicing over the fade-out period. The fade-out circuit 330, upon the start of the splicing, effects the fade-out of the output signal of the memory circuit, in synchronism with the fade-in circuit 305.

The output signal of the fade-in circuit 305 and the output signal of the fade-out circuit 330 are respectively passed through the keyed clamp circuit 306 and 329 and summed up in the adder 307. The luminance signal obtained by the summing in the adder 307 is given a compound sync signal C.Sync (horizontal sync signal, vertical sync signal) in the adder 308, and thereafter, subjected to signal processing to be recorded in the VTR, such as emphasis treatment and FM modulation, in the VTR luminance signal record processor 309.

The color difference signals (R−Y, B−Y) output from the camera 300 are clamped to a fixed potential in the keyed clamp circuit 313 and the keyed clamp circuit 314, respectively. The output signal of the keyed clamp circuit 313 is on one hand input to the multiplier 315 and on the other input to the memory circuit made up of the ADC 331, field memory 332, DAC 333, and the controller 334. The output signal of the keyed clamp circuit 314 is on one hand input to the multiplier 316 and on the other input to the above memory circuit. The color difference signals (R−Y, B−Y) and the chroma signal subcarriers $f_{sc}$ (signal at approximately 3.58 MHz in the NTSC system) with a phase difference of 90° are multiplied, respectively, in the multipliers 315 and 316 and these multiplied signals are added in the adder 317, whereby a balanced modulated chroma signal is obtained. The chroma signal is deprived of the unnecessary signal for the blanking period (brought to a fixed potential level) in the blanking circuit 318 and thereafter it is input to the fade-in circuit 319. The fade-in circuit 319, with the start of the splicing, performs a fade-in operation of the output signal of the blanking circuit 318, in synchronism with the fade-in circuit 305 and the fade-out circuit 330 for the luminance signal series.

Since the memory circuit operates to store one-field picture immediately before the REC pause state as described above, there are stored therein the color difference signals (R−Y, B−Y) for one-field period. With the start of the splicing, the color difference signals are output from the memory circuit and these signals are processed in the multipliers 324, 325 and the adder 326 and turned into a balanced modulated chroma signal.

The chroma signal obtained from the output signals from the memory circuit, with the start of the splicing, is subjected to a fade-out treatment in the fade-out circuit 327.

The output signal of the fade-in circuit 319 and the output signal of the fade-out circuit 327 are respectively passed through the keyed clamp circuits 320, 328 and added together in the adder 321, and the sum signal is subjected to signal processing for being recorded in the VTR, such as downconversion of the frequency, in the VTR chroma signal record processor 322.

The luminance signal FM modulated in the VTR luminance signal record processor 309 and the chroma signal subjected to the down conversion of the frequency in the VTR chroma signal record processor 322 are added together in the adder 310 and thereafter recorded by the rotary head 311 on a magnetic tape 312.

The memory circuit made up of the ADC 331, field memory 332, DAC 333, and the controller 334 is controlled by the horizontal sync signal H.Sync and the vertical sync signal V.Sync supplied from the camera 300 and a REC pause ON/OFF control signal for turning on/off the REC pause state (which signal is input from an input terminal 335).

Figure 9:
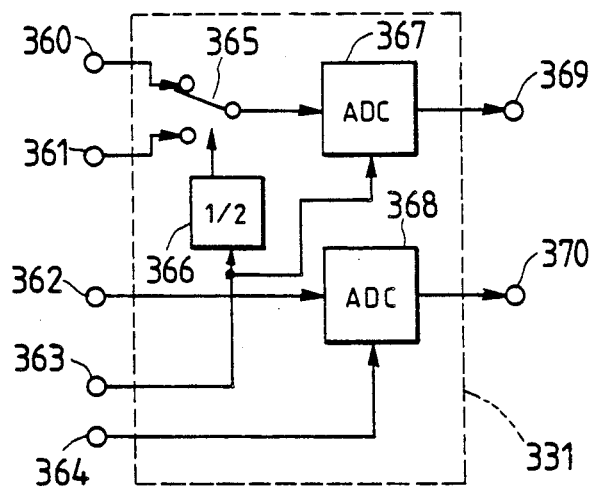
FIG. 9 and FIG. 10 are block diagrams showing examples of particular arrangements of an ADC used in the present invention.

An example of concrete configurations of an ADC 331 is shown in FIG. 9.

The R−Y signal is input from an input terminal 360 and the B−Y signal is input from an input terminal 361. The input R−Y signal and B−Y signal are multiplexed at the $f_{sc}$ frequency (about 3.58 MHz in the NTSC system) by means of a switch 365 and converted into 6-bit digital data in an ADC 367, and then output from an output terminal 369.

The luminance signal is input from an input terminal 362 and converted into 8-bit digital data in an ADC 368, and then output from an output terminal 370.

Here, a 2-$f_{sc}$ clock is input from an input terminal 363 and a 3-$f_{sc}$ clock is input from an input terminal 364, which respectively drive the ADCs 367 and 368.

Figure 11:
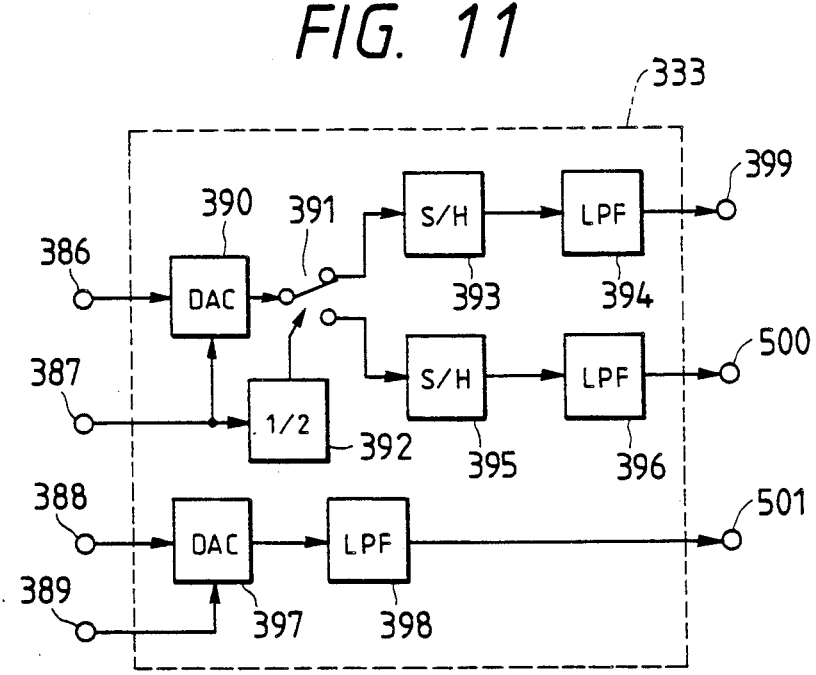
FIG. 11 and FIG. 12 are block diagrams showing examples of particular arrangements of a DAC used in the present invention.

An example of concrete configurations of the DAC 333 is shown in FIG. 11.

Digital data of color difference signal input from an input terminal 386 is digital-to-analog converted into two, R−Y and B−Y, signals, by means of a DAC 390 and a switch 391, deprived of unnecessary band portions in LPFs 394 and 396, and then output from output terminals 399 and 500. Digital data of luminance signal input from an input terminal 388 is converted into an analog signal in an DAC 397, deprived of an unnecessary band portion in an LPF 398, and output from an output terminal 501.

Here, a 2-$f_{sc}$ clock is input from an input terminal 387 and a 3-$f_{sc}$ clock is input from an input terminal 389, which drive the ADCs 390 and 397 and the switch 391.

Once again, the above system in FIG. 7 is that used in the case where cross faded picture images are picked up by having one-field picture stored in a memory immediately before a REC pause state was established and, when, after a while, splicing is started, having the stored picture faded out and added to a new picture faded in.

Figure 8:
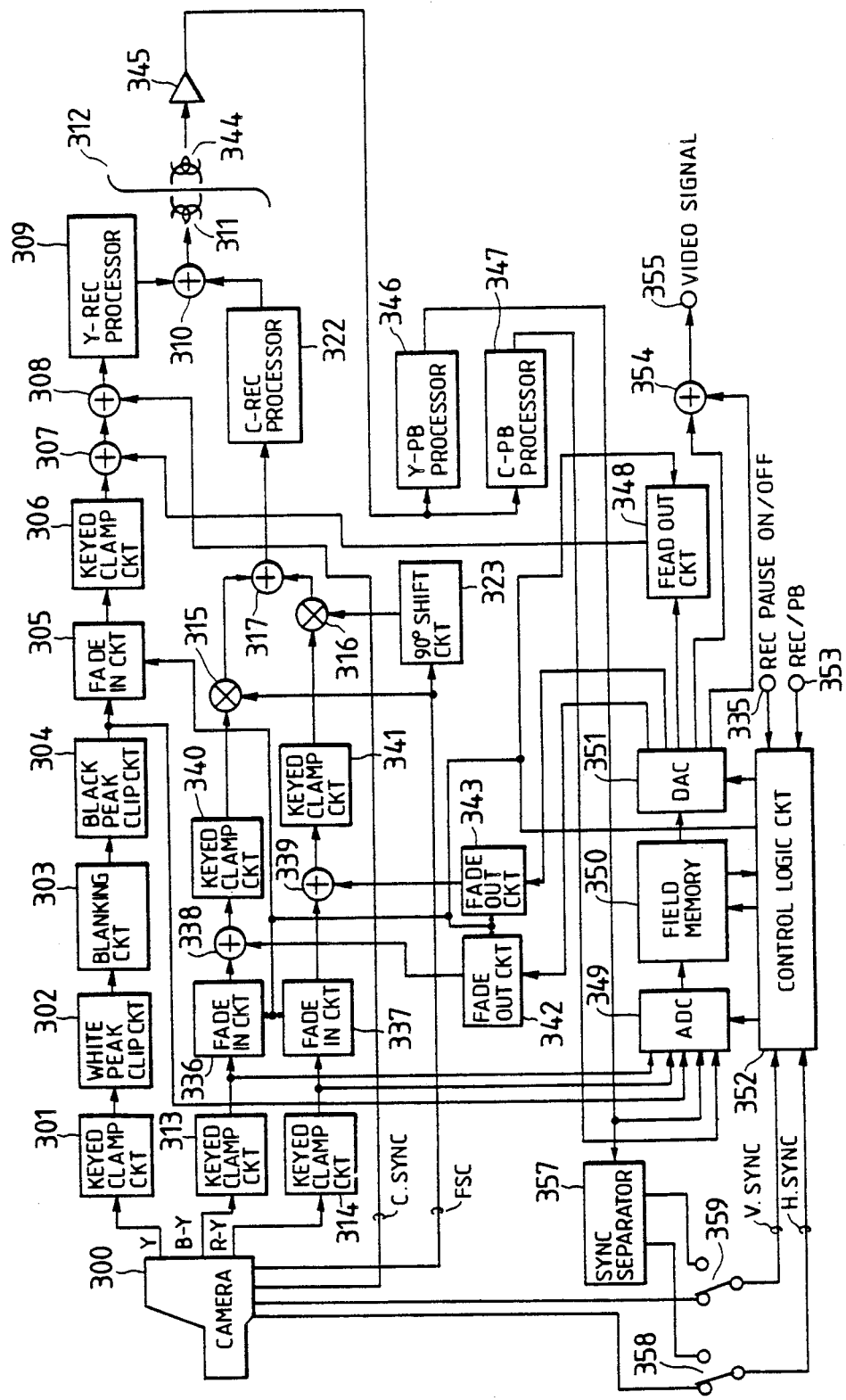

Another embodiment of the present invention is shown in FIG. 8.

In the embodiment of FIG. 8, what is different from that of FIG. 7 is that fade-out of the stored chroma signal and fade-in of the new chroma signal are not carried out in the carrier signal band (3.58 MHz band) but carried out in the color difference signal band (base band) and that the memory circuit is not only used at the time of recording but also used at the time of playback as a noise reducer.

The fade-in and fade-out at the base band will be described below. The color difference signals (B−Y, R−Y) output from a camera 300 are clamped to a fixed potential in keyed clamp circuits 313 and 314, and then input, on one hand, to fade-in circuits 336 and 337, and on the other, to a memory circuit made up of an ADC 349, a field memory 350, a DAC 351, and a control and arithmetic circuit 352. The fade-in circuits 336 and 337, as the splicing is started, fade in the two, R−W and B−Y, signals, respectively. Meanwhile, as the splicing is started, the memory circuit storing one-field picture immediately before a REC pause state was established, outputs the two, R−W and B−Y, signals to fade-out circuits 342 and 343. The fade-out circuits 342, 343, with the start of the splicing, fade out the two, R−W and B−Y, signals.

Output signals of these fade-in circuits 336, 337 and the fade-out circuits 342, 343 are each added up in adders 338 and 339, passed through keyed clamp circuits 340 and 341, and modulated into a balanced modulated chroma signal by means of multipliers 315 and 316 and an adder 317.

The memory circuit made up of the ADC 349, the field memory 350, the DAC 351, and the control and arithmetic circuit 352 will be described below.

The memory circuit operates as a mere memory circuit of one-field picture image at the time of recording, but it operates at the time of playback as a noise reducer making use of the storing function of one-field picture image. It serves as the noise reducer by having the data in the one-field memory calculated in the control and arithmetic circuit 352.

Figure 10:
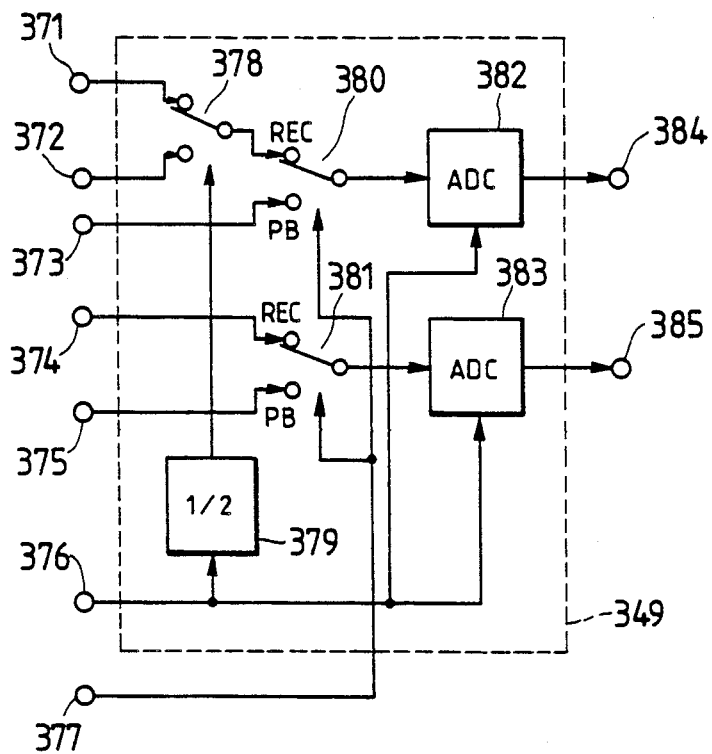

An example of a concrete configurations of the ADC 349 is shown in FIG. 10.

At the time of recording, R−W and B−Y signals input from input terminals 371 and 372 are multiplexed at a frequency of 1.5-$f_{sc}$ by means of a switch 378, and the multiplexed signal is sent through a switch 380 to an ADC 382 to be converted into 6-bit digital data therein and is output from an output terminal 384.

A luminance signal introduced from an input terminal 374 is sent through a switch 381 to an ADC 383 to be converted into 8-bit digital data therein and is output from an output terminal 385.

At the time of playback, a chroma signal introduced from an input terminal 373 is sent through the switch 380 to the ADC 382 to be converted into 6-bit digital data therein.

A luminance signal introduced from an input terminal 375 is sent through the switch 381 to the ADC 383 to be converted into 8-bit digital data therein.

The ADCs 382, 383 and the switch 378 are driven by a 3-$f_{sc}$ clock introduced from an input terminal 376 and the switches 380, 381 are driven by a REC/PB signal introduced from an input terminal 377.

Figure 12:
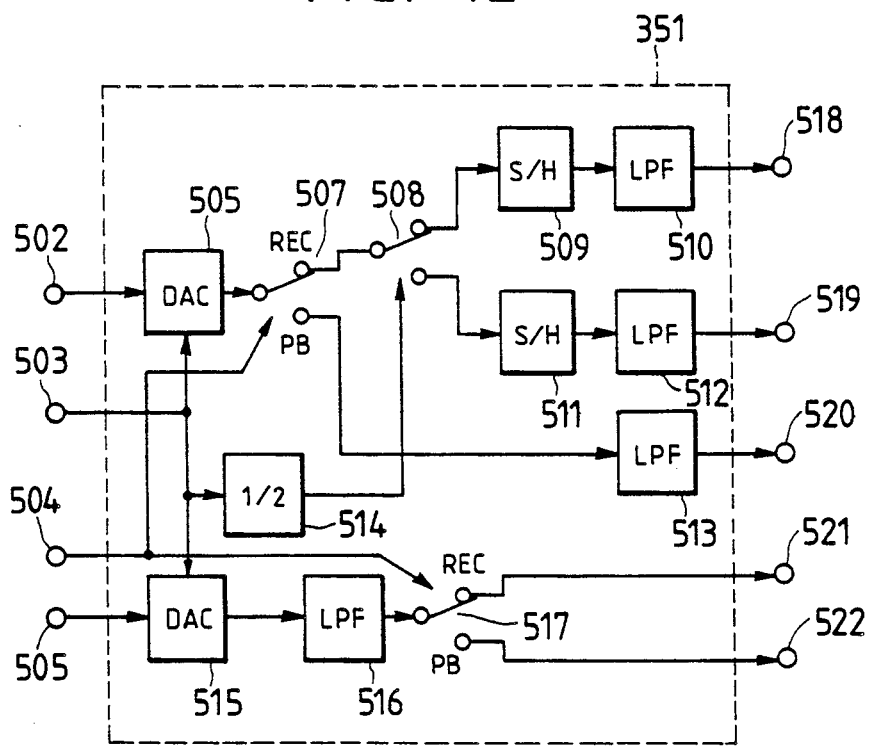

An example of concrete configurations of the DAC 351 is shown in FIG. 12.

At the time of recording, digital data of color difference signal introduced from an input terminal 502 is converted into two, R−W and B−Y, signals in an analog form by means of a DAC 505, switches 507 and 508, and sample hold circuits (S/Hs) 509 and 511, and these signals are deprived of unnecessary band portions in LPFs 510 and 512 and output from output terminals 518 and 519.

Luminance signal digital data is introduced from an input terminal 505 and converted into an analog luminance signal in an DAC 515, deprived of an unnecessary band portion in an LPF 516, and output through a switch 517 from an output terminal 521.

At the time of playback, chroma signal digital data introduced from the input terminal 502 is converted into an analog chroma signal in the DAC 505, and the analog signal is sent through the switch 507 to an LPF 513 to be deprived of an unnecessary band portion therein and output from an output terminal 520.

Luminance signal digital data is converted into an analog signal in the same way as at the time of recording and output through the PB side of the switch 517 from an output terminal 522.

The DACs 505, 515 and the switch 508 are driven by a 3-$f_{sc}$ clock introduced from an input terminal 503 and the switches 507, 517 are driven by a REC/PB control signal introduced from an input terminal 504.

Figure 13:
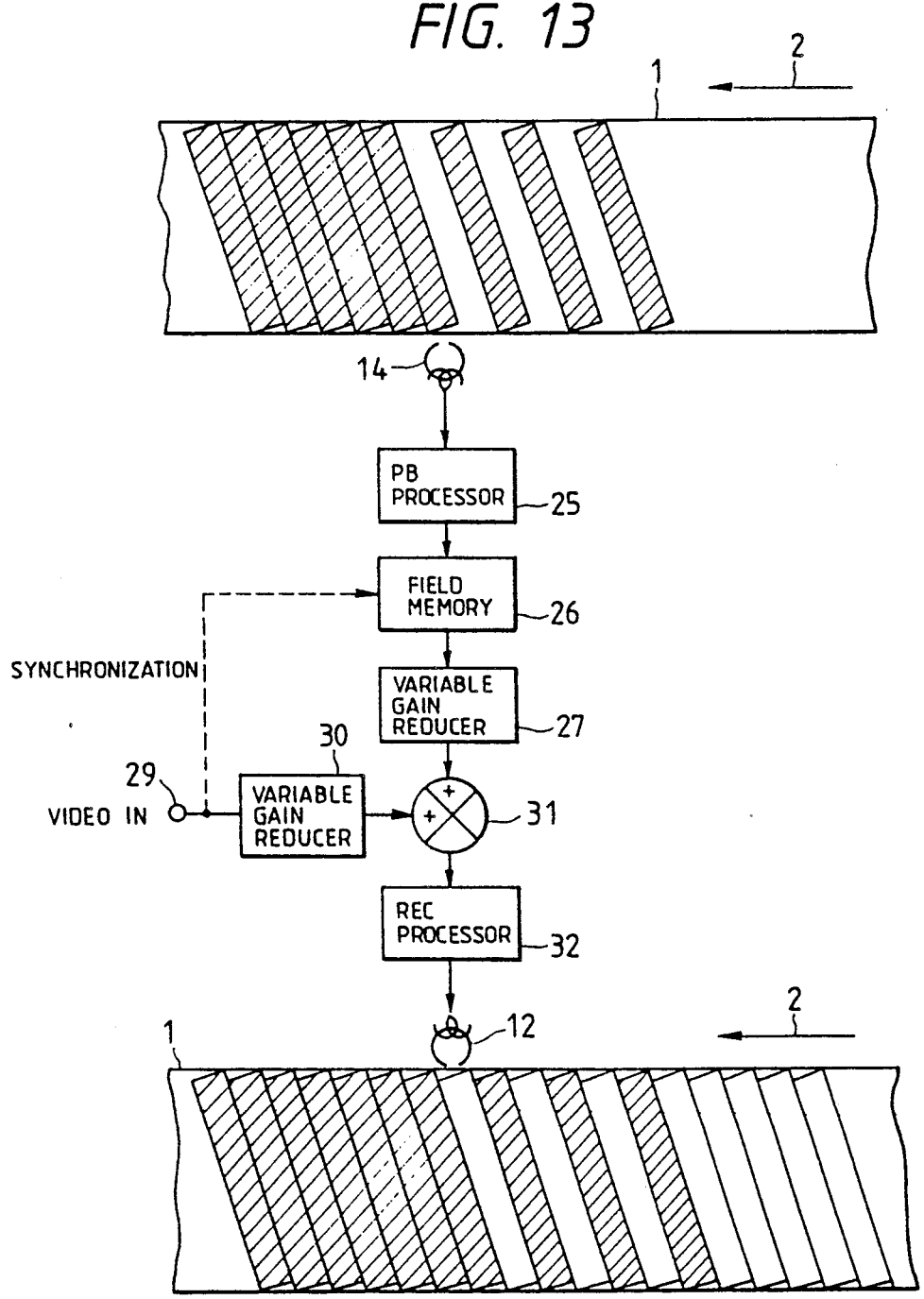
FIG. 13 and FIG. 14 are block diagrams showing another example of the present invention.

FIG. 13 is a diagram showing still another embodiment of the present invention. What is characteristic of the embodiment of FIG. 13 is that, during a splice period, an old signal is recorded in every other field, and when the splicing of a new signal is started, recording is made such that into each vacant track in the splice period is recorded a sum signal of the old signal in the preceding track and the new signal.

In the splice period, it is arranged such that a head 14 for one channel of the two ordinary record//playback heads attached to a cylinder at intervals of 180° is used for playing back the old signal and a head 12 for the other channel is used for recording the new signal. Thereby, during the period when the head 14 scans the tape 1, a track shadowed by oblique lines in FIG. 13 is played back by the head 14 and the signal is stored in a memory 26. Then, during the next period when the heads are switched so that the head 12 scans the tape 1, the old signal stored in the memory 26 and a new signal from the input terminal 29 are added up in an adder 31 and, after being processed for recording, the sum signal is recorded along the vacant track on the tape 1. Then, during the next period when the heads are switched, the track shadowed by the oblique lines is played back by the head 14 and the signal is stored in the memory 26, and during the following period when the heads are switched, the old signal from the memory 26 and the new signal are added up and recorded into the vacant track. By repeating the above described operations, it is made possible in the present embodiment to perform the cross-fade during a splice period without using a special head but using only an ordinary record/playback head.

It is a matter of course that variable gain reducers 27, 30 and the adder 31 function in the same way as those described hereinbefore.

Figure 14:
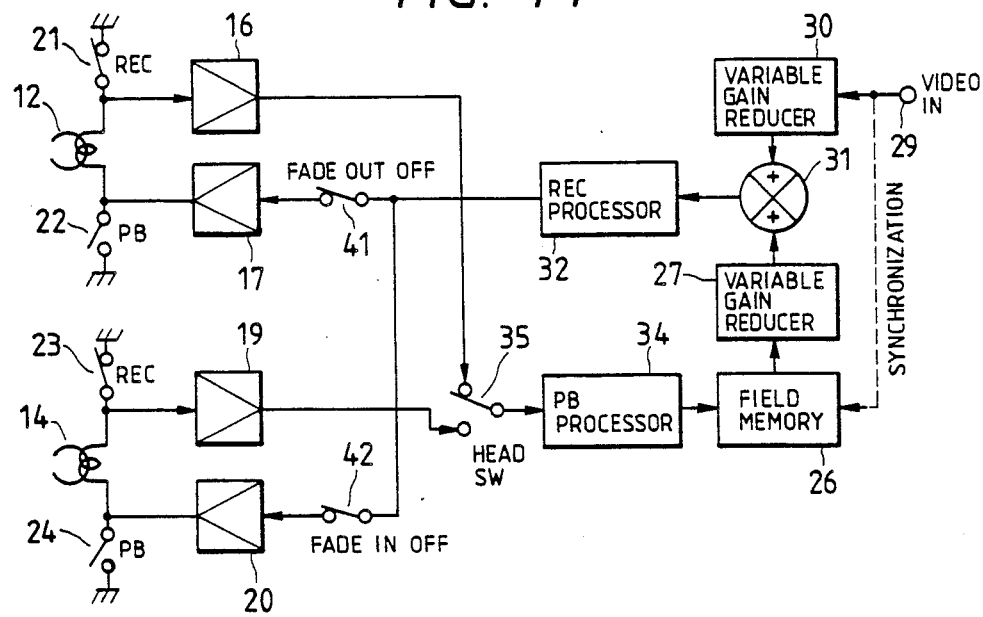
Figure 15:
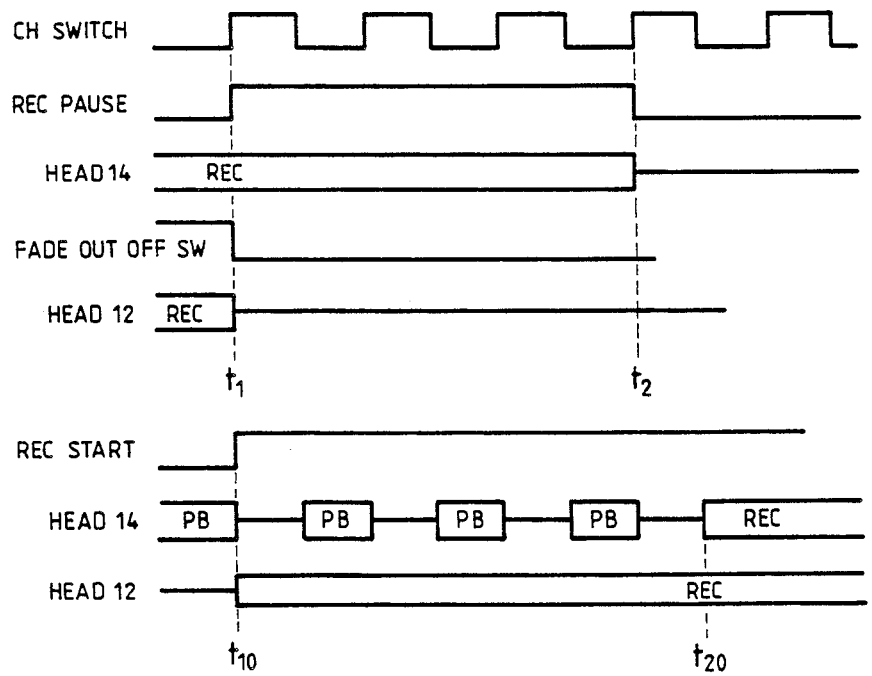
FIG. 15 is a timing chart.

FIG. 14 is a system block diagram of the embodiment shown in FIG. 13, and FIG. 15 is a timing chart for the same. Referring to FIG. 14, reference numerals 41 and 42 denote fade in/out switches, while other parts are of the same functions as those shown in the drawings up to the preceding drawing.

When the REC pause signal is turned ON at the timing $t_1$ in FIG. 15 while an old signal is being recorded, the recording current keeps on flowing through the head 14 up to the timing $t_2$. However, after the timing $t_1$, a fade-out OFF switch 41 is opened so that no recording current flows through the head 12. Hence, within this splice period $t_1$ to $t_2$, only the head 14 operates and single-channel track recording is made thereby. Then, when new signal is started to be recorded in the splice period from the timing $t_{10}$, the recording current starts to flow through the head 12 upon the record starting at the timing $t_{10}$ as shown in FIG. 15. However, since a fade-in OFF switch 42 is held opened until timing $t_{20}$, no record current flows through the head 14, and in the meantime, intermittent signal playback is performed during the splice period from $t_{10}$ to $t_{20}$ as shown in FIG. 15. By using the arrangement of FIG. 14 and FIG. 15 as described above, when a new signal is to be recorded during a splice period, the sum signal of an old signal and the new signal can be recorded by one head and the cross-fade can thereby be performed.

Figure 16:
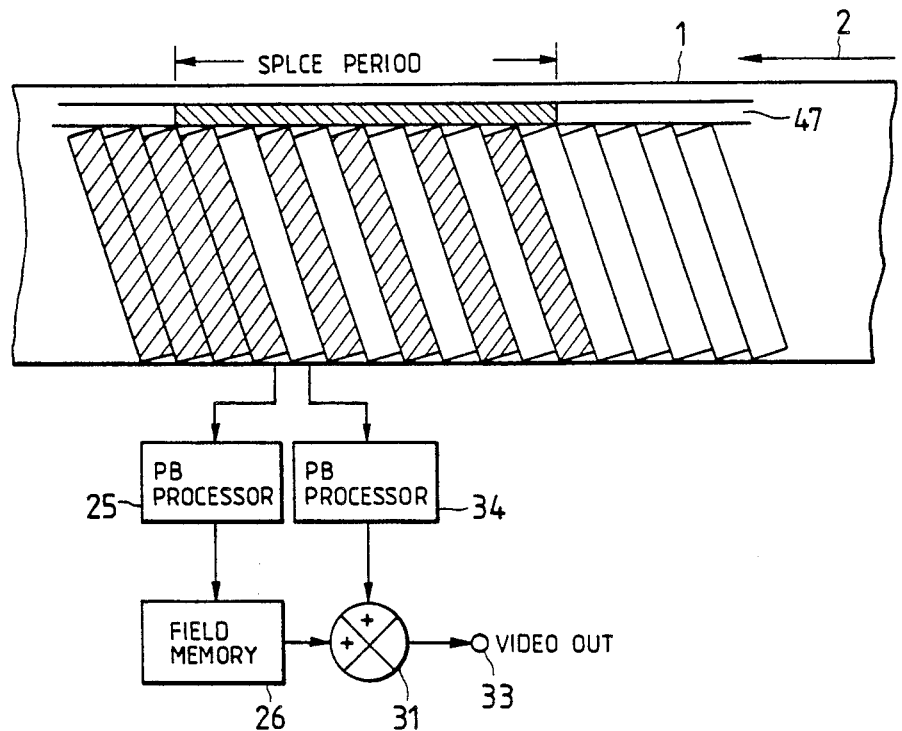
FIG. 16 and FIG. 17 are block diagrams showing another embodiment of the present invention.

FIG. 16 is a diagram showing still another embodiment of the present invention. What is characteristic of the arrangement in FIG. 16 is that the cross-fade treatment during a splice period is given not at the time of recording but at the time of playback and a discrimination signal for identifying a splice period is recorded on a linear track.

In the splice period, as shown in FIG. 16, an old signal (indicated by shading it with oblique lines in the diagram) and a new signal (indicated by leaving it blank) are recorded in the alternate fields. Consequently, if this splice period were played back as it is at the time of playback, there would occur trouble of flickering on the screen. Hence, a discrimination signal for the splice period is recorded using a linear track 47 shown in FIG. 16 (the portion shaded by oblique lines in the figure). Thereby, at the time of playback, the discrimination signal is detected, and only during the detected splice period, the video signal for a preceding track stored in a field memory 26 and the playback video signal from a current track are summed up and this sum signal is output from an output terminal 33.

More particularly, the field memory 26 stores every played back signal, and this signal is adapted to be output from the memory (this is called the old signal) in synchronism with the playback signal from the track currently played back (this is called the new signal), and the old signal and the new signal are summed up to be output as the video signal, and thus, cross-fade during the splice period is made possible.

Figure 17:
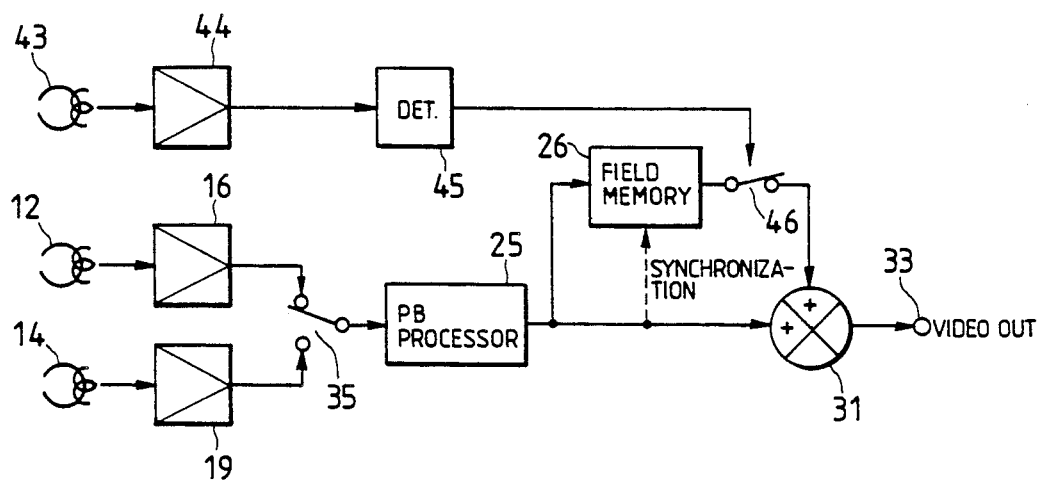

FIG. 17 is a system block diagram of the embodiment of FIG. 16. Referring to FIG. 17, reference numeral 43 denotes a head for reproducing a signal from the linear track, 44 denotes an amplifier for amplifying that signal, 45 denotes a determination circuit for determining whether the signal from the linear track 47 is that indicating a splice period or not, 46 denotes a switch to be held ON only during a splice period, and other parts are the same as those shown in the drawings up to the preceding one.

What is characteristic of FIG. 17 is that the switch 46 is held ON only during a splice period and thereby an old signal from the field memory 26 and a new signal is summed up.

The way of recording the discrimination signal is not limited to that described above. It can of course be achieved, for example, by frequency multiplexing or time base multiplexing of the signal with the video signal.

Figure 18:
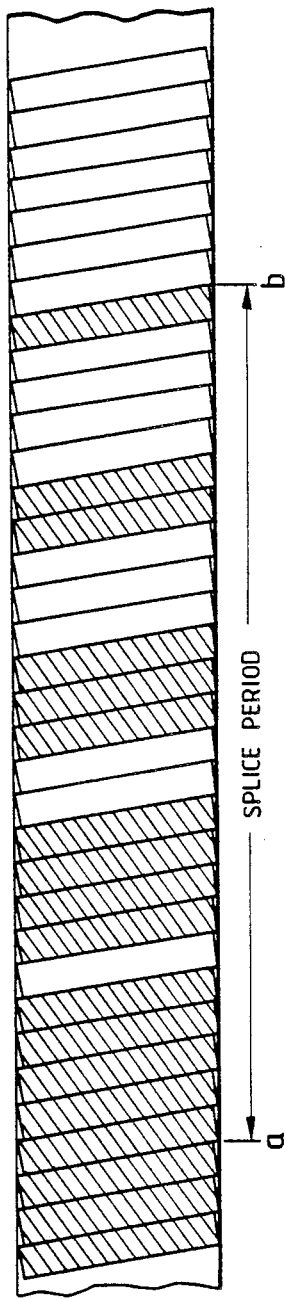
FIG. 18 is a pattern diagram showing another embodiment of the present invention.
Figure 19:
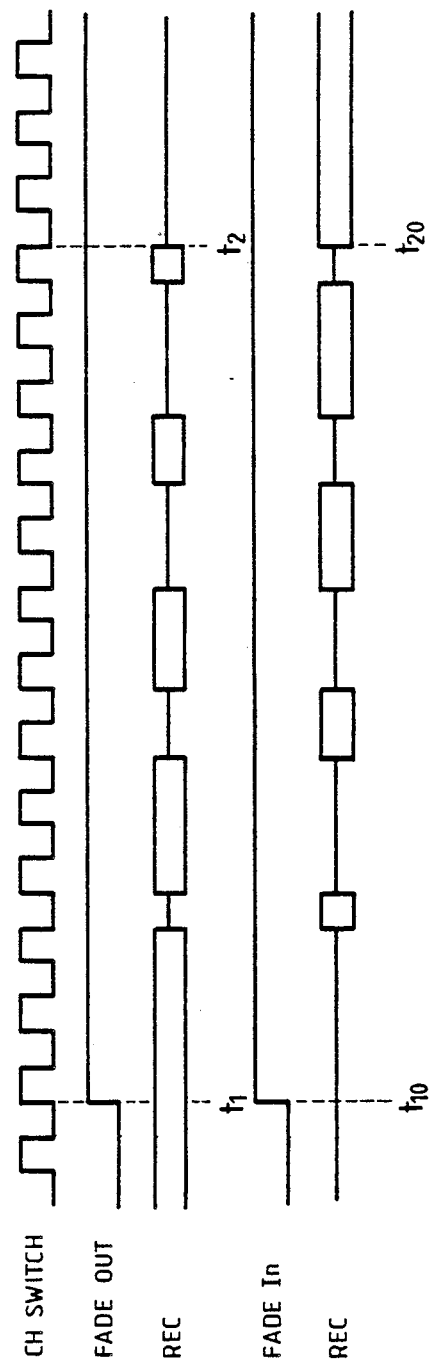
FIG. 19 is a timing chart.

FIG. 18 and FIG. 19 are diagrams showing still another embodiment of the present invention. What is characteristic of the embodiment shown in FIG. 18 and FIG. 19 is that an old signal and a new signal are not recorded in alternate fields during a splice period but they are recorded such that, at the beginning of the splice period, one record field for the new signal is provided between several fields for the old signal, then the ratio between the new and the old signal record fields is gradually reversed, and, at the end, one old signal record field is provided between several new signal record fields. More particularly, as the fade-out is started at $t_1$ in FIG. 19, the recording current is started to be intermittently flown and, up to the timing $t_2$, the period of interruption is gradually prolonged, and as the fade-in is started at $t_{10}$, the period of interruption of the recording current is, contrary to the above, gradually shortened up to the timing $t_{20}$.

Figure 20:
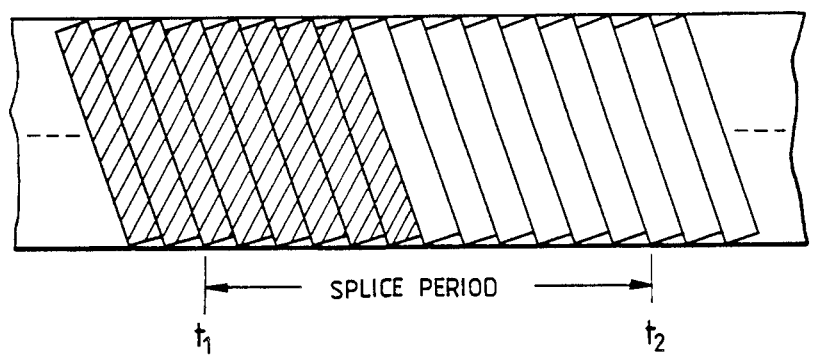
FIG. 20 and FIG. 21 are diagrams showing a timing relationship in another embodiment.
Figure 21:
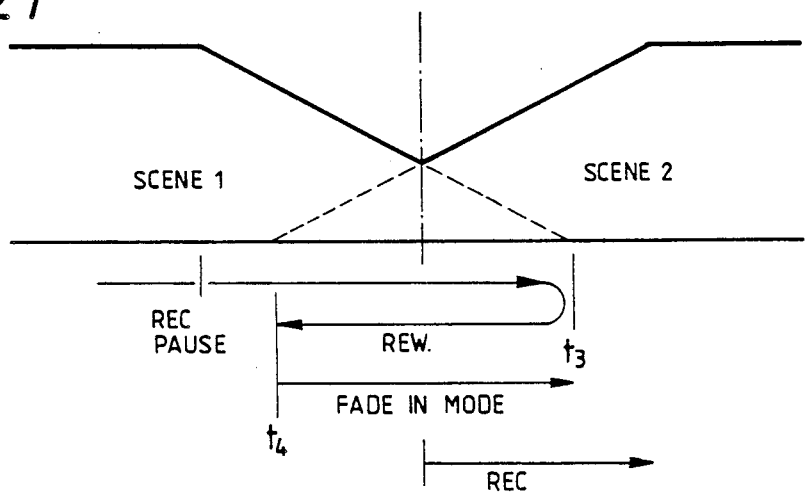
Figure 22:
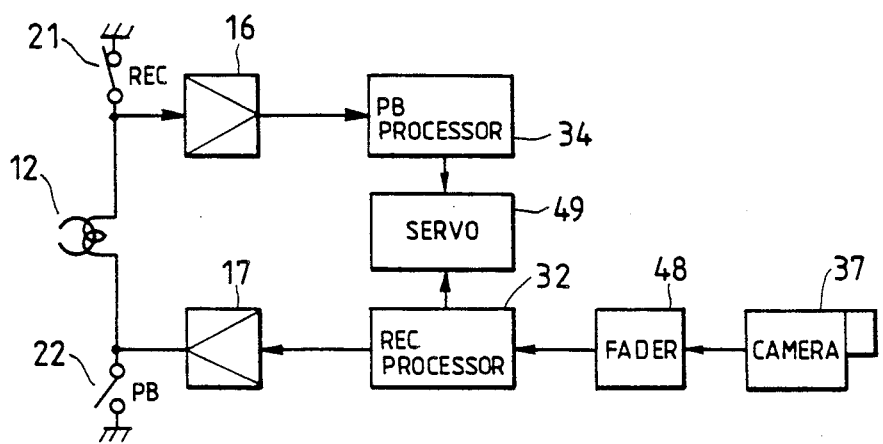
FIG. 22 is a block diagram of a system operating at the timing relationship as shown in FIG. 20 and FIG. 21.

FIG. 20, FIG. 21, and FIG. 22 are diagrams showing still another embodiment of the present invention. What is characteristic of the present embodiment is that, at the time of fade out/in, the fade out/in is effected when the signal level has reached a specific level, and thus, the unnaturalness detected by the sense of sight from the spliced picture images is eliminated.

Referring to FIG. 20, the shaded portion by oblique lines indicates an old signal and the blank portion indicates a new signal which has been spliced thereto afterward. The splice period is between $t_1$ and $t_2$ and the changeover from the old signal to the new signal occurs within the period.

As shown in FIG. 21, with the start of the splice period at $t_1$, the scene 1 comes to be recorded with its signal level gradually reduced, and when the tape has traveled up to $t_3$, the tape is automatically rewound until it comes into a standby state at $t_4$. When recording is resumed to record another scene 2, the VTR and the camera start operations at $t_4$, but the recording state is not established until the period of time necessary for the servo to reach a stabilized state is over and the signal level for the scene 2 has reached a certain level. After all, the recording state is established when the signal level for the scene 2 has reached the same level as that at which the fade-out has been effected.

By doing as above, the signal level at the time of playback will become as indicated by a solid line in FIG. 21, in which the signal level at the changeover point will, for example, be about half the maximum amplitude. Thus, splicing not producing a dropout of the signal at the changeover point, not causing an abrupt change in the picture image, and not giving any feeling of unnaturalness can be achieved.

FIG. 22 is a system block diagram. After the timing $t_1$, the level of the signal from a camera 37 is gradually lowered by means of a fader 48 until the timing $t_3$. On the other hand, from the timing $t_4$, the level of the signal from the camera 37 is gradually raised by means of the fader 48 until the timing $t_2$.

Figure 23:
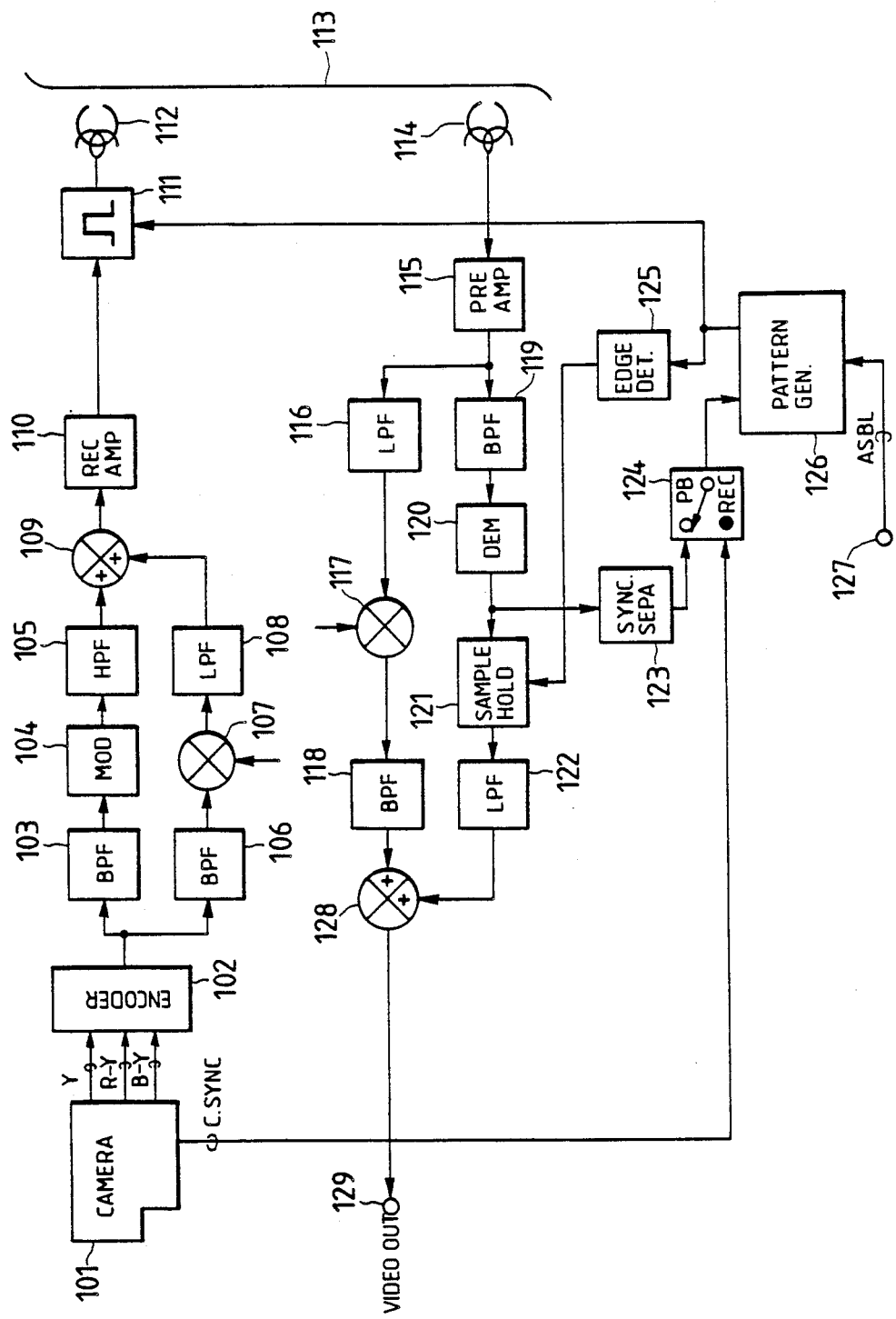
FIG. 23 and FIG. 24 are a block diagram and a pattern diagram showing another embodiment of the present invention.
Figure 24:
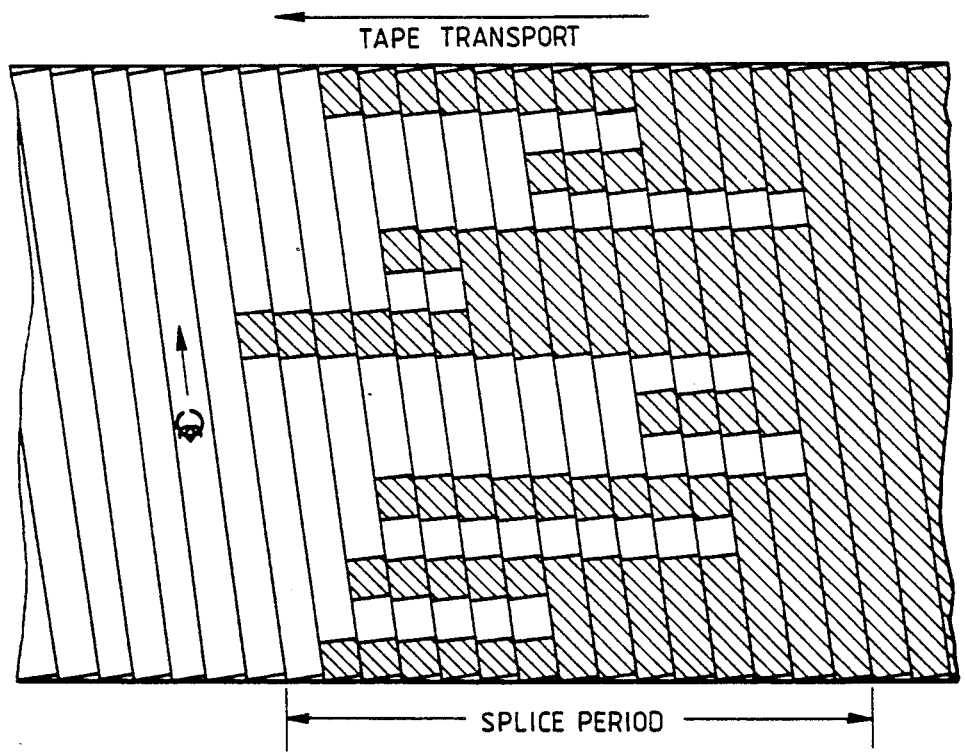

FIG. 23 is a block diagram of a system in which the picture plane is divided into mosaics at the time of splicing and one scene is changed over to the other through changes in the mosaics. FIG. 24 is a diagram of a tape pattern obtained during a splice period by the use of the circuit shown in FIG. 23. In the diagram, the blank portion is the record portion of an old scene and the shaded portion is a spliced portion thereof of the new scene. Since the head scans the successive tracks from bottom to top in the diagram, it appears on a monitor screen that the picture plane, divided into mosaics, is gradually changed over to the new picture plane. Now, the operation of the circuit will be described in accordance with FIG. 23. Referring to the diagram, reference numeral 101 denotes a video camera which outputs, for example, components signals Y, R−Y, and B−Y. Reference numeral 102 denotes an encoder for modulating the component signals into a composite signal of the NTSC (or PAL) system. 103 denotes a BPF for separating a luminance signal from the composite video signal, 104 denotes a luminance signal processor such as an FM modulator, 105 denotes an HPF, 106 denotes a BPF for separating the chroma signal component from the video signal, 107 denotes a frequency converter for downconversion of the received chroma signal, 108 denotes an LPF, 109 denotes an adder for adding the FM modulated luminance signal and the downconverted chroma signal, 110 denotes a record amplifier, 111 denotes a gate circuit for controlling the record current, 112 denotes a magnetic head, and 113 denotes a magnetic tape, and these are circuit elements composing the recording system. Reference numeral 114 denotes a magnetic head, 115 denotes a playback preamplifier, 116 denotes an LPF for separating downconverted chroma signal from the playback signal, 117 denotes a frequency converter for demodulating the downconverted chroma signal into a subcarrier band, 118 denotes a BPF, 119 denotes a BPF for separating an FM modulated luminance signal from the playback signal, 120 denotes a luminance signal processor such as an FM demodulator, 121 denotes a sample hold circuit, 122 denotes an LPF, 123 denotes a sync separator, 124 denotes a switch, 125 denotes a detector for detecting leading and trailing edges of a received control signal, and 126 denotes a pattern signal generator for controlling the gate circuit 111 and the detector 125, which outputs a gate signal corresponding to the new scene record portion on the mosaic picture plane in response to a sync signal delivered from the switch 124 and a splice control signal introduced from an input terminal 127.

According to the present embodiment, it is possible to record tracks which are divided into mosaics as shown in FIG. 24 at will by means of the gate circuit 111 controlling the record current, and at the time of playback, it is achieved to progressively change over the picture plane divided into mosaics to a new picture plane to thereby perform splicing. The sample hold circuit 121 provided at the next stage of the playback luminance signal processor 120 serves for sample holding at the time of changeover of the mosaic picture plane and also suppresses occurrence of noise where the old picture plane playback signal and the new picture plane playback signal are joined up.

By performing the splicing according to the present embodiment, a new visual effect is provided that a picture plane divided into mosaics is gradually changed from that of an old scene to that of a new scene, quite different from the conventional changeover from an old view to a new view in an instant.

Figure 25:
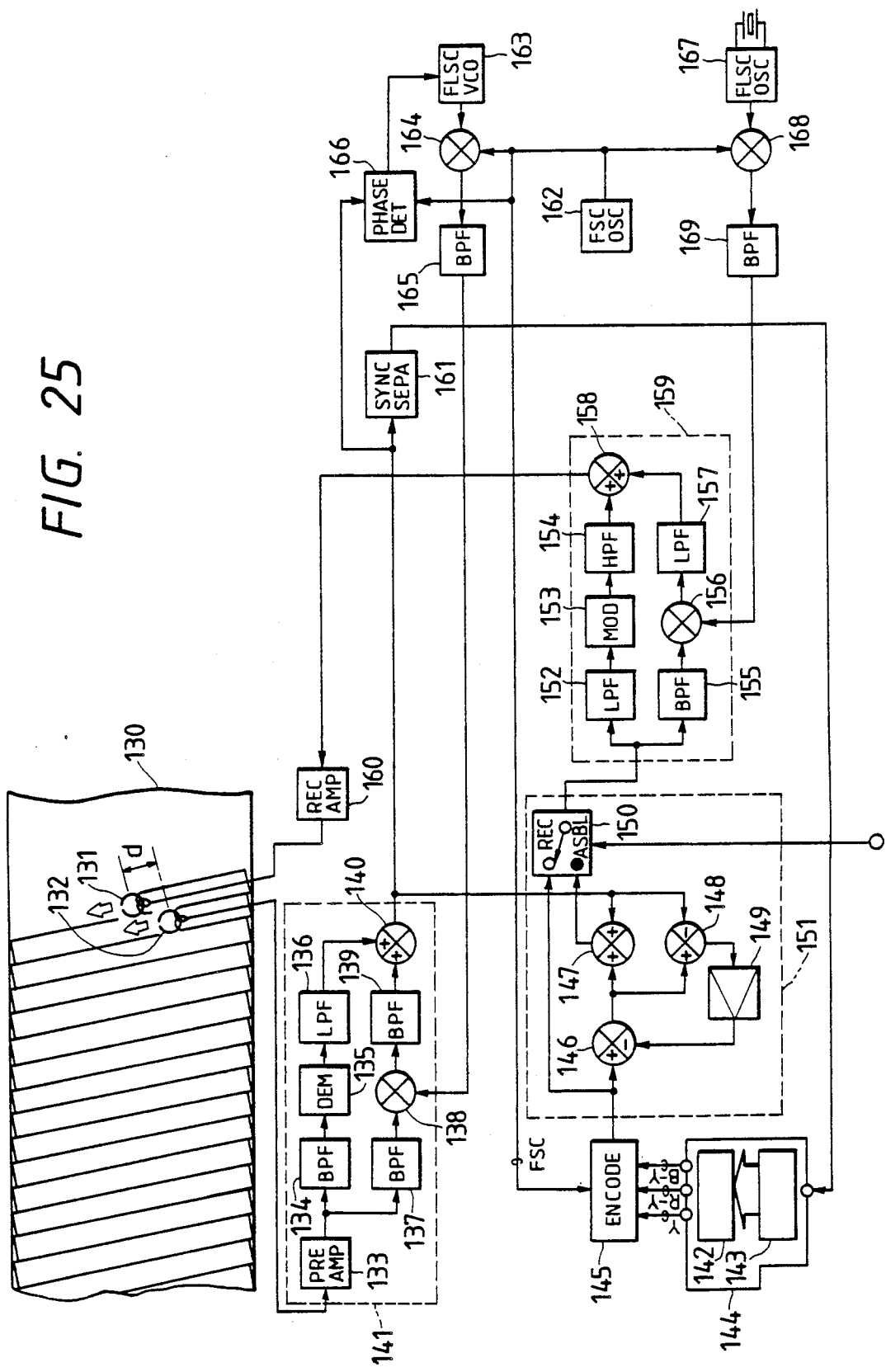

FIG. 25 is a block diagram showing still another embodiment of the present invention. Referring to the figure, reference numeral 130 denotes a magnetic tape, 131 denotes a record head, and 132 denotes a playback head, which plays back the signal which the record head 131 recorded one field before. Reference numeral 133 denotes a playback amplifier, 134 denotes a BPF for separating the luminance signal component from the playback signal, 135 denotes a playback luminance signal processor such as an FM demodulator, 136 denotes an LPF, 137 denotes a BPF for separating the chroma signal component from the playback signal, 138 denotes a frequency converter demodulating the downconverted chroma signal separated by the BPF 137 into a subcarrier band, 139 denotes a BPF, 140 denotes an adder for adding up the demodulated luminance signal and subcarrier chroma signal to thereby form a composite video signal, and 141 denotes a playback signal processor. Reference numeral 142 denotes a sensor for delivering Y, R−Y, and B−Y signals such as a CCD image pickup device.

Further, reference numeral 143 denotes an image pickup device driver for producing a drive signal to drive the sensor 142, from the sync signal separated from the playback video signal, 144 denotes a video camera, 145 denotes an encoder for combining the Y, R−Y, and B−Y signals output from the video camera 144 into a composite signal, 146, 147, and 148 denote adders, 149 denotes a feedback amplifier, 150 denotes a switch, 151 denotes a splice fader, 152 denotes an LPF for separating the luminance signal, 153 denotes a luminance signal processor such as an FM modulator, 154 denotes an HPF, 155 denotes a BPF for separating the chroma signal, 156 denotes a frequency converter for downconversion of the chroma signal, 157 denotes a BPF, 158 denotes an adder for adding up the FM modulated luminance signal and the downconverted chroma signal, 159 denotes a record signal processor, 160 denotes a record amplifier, 161 denotes a sync separator for separating the sync signal from the playback video signal, 162 denotes a subcarrier frequency oscillator, 163 denotes a voltage controlled oscillator for generating the low subcarrier frequency used for downconversion of the chroma signal, 164 denotes a frequency converter, 165 denotes a BPF, 166 denotes a phase detector, 167 denotes a low subcarrier frequency oscillator, 168 denotes a frequency converter, 169 denotes a BPF, and 170 denotes an input terminal for a splice control signal.

According to the present embodiment, a signal read by the succeeding head 132 is demodulated to a composite video signal in the playback signal processor 141 and it is input to the splice fader 151. Meanwhile, the video camera 144 operates in synchronism with the sync signal separated from the playback signal, whereby the playback video signal input to the splice fader 151 and the record video signal from the video camera 144 coincide with each other on the time base.

The playback APC circuit composed of the phase detector 166, VCO 163, frequency converter 164, BPF 165, and the $f_{sc}$ oscillator 162 performs a comparison, in the phase detector 166, of the relative phase between the burst signal in the video signal output from the playback signal processor 141 and the subcarrier frequency input to the encoder 145 to thereby perform APC control to keep in phase the burst signals of both the old signal (playback signal) and the new signal (record signal) input to the splice fader 151.

The switch 150 is connected with the side indicated by the white circle in the normal record mode, but it is connected with the side indicated by the black circle in the splice mode.

The splice fader 151 is adapted such that the record signal from the video camera 144 is gradually added to the playback signal from the magnetic head 132 in its adder 147 during the splice period, and hence the splicing to effect gradual fading from an old picture to a new picture can be achieved.

Since feedback control is performed in the present embodiment by feeding back a control signal to the adder 146 through the adder 148 and the feedback amplifier 149, it is also possible to arrange such that the output signal of the adder 146 is used as the input signal to the switch 150 at the side indicated by the black circle.

In the present embodiment, the first head 131 and the second head 132 are provided with opposite, positive and negative, azimuths and there are provided four heads in all. In the case, for example, of an 8-mm video, it is preferable to set the interhead distance indicated by character d in the diagram to 2.5 H.

Figure 26:
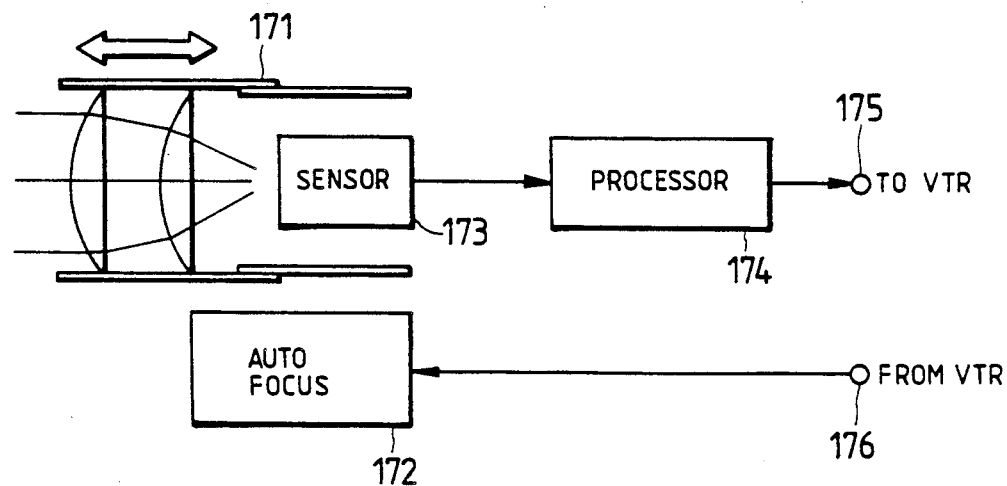
FIG. 25 and FIG. 26 are system block diagrams showing another embodiment of the present invention.

A further embodiment of the present invention is shown in FIG. 26.

Referring to the figure, reference numeral 171 denotes a lens-barrel, 172 denotes an auto focus circuit, 173 denotes an image pickup device, 174 denotes a signal processor, 175 denotes an output terminal for the video signal, and 176 denotes an input terminal for a splice control signal.

In a video camera in general, the image pickup device 173 converts optical information into an electric signal, which is further converted into a video signal in the signal processor 174 to be output to the VTR portion.

Hence, in the present embodiment, the camera is provided with the input terminal 176 for a control signal indicative of a splice mode, whereby, in the splice mode, the auto focus circuit 172 is controlled so that focus-out is effected while a fade-out treatment of an old picture is given. The auto focus circuit 172 is also controlled so that focus-in is effected while a fade-in treatment of a new picture is given.

In the present embodiment as described above, it is adapted such that not only fade out/in but also focus out/in is effected in a splice mode, and therefore a smoother changeover of the picture image can be achieved.

What is claimed is:

1. A magnetic tape recordation apparatus comprising:
   first and second magnetic recording heads mounted along a first plane on a rotary cylinder for recording a video signal on a magnetic recording tape, the first recording head having a first azimuthal angle and the second recording head having a second azimuthal angle, the second azimuthal angle being different from the first azimuthal angle;
   first and second reading heads mounted along a second plane on the rotary cylinder for reading the video signal recorded on the magnetic tape, the first reading head having the first azimuthal angle and the second reading head having the second azimuthal angle, the first and second planes being offset along an axial direction of the rotary cylinder;
   a mixing circuit operatively connected with at least one of the reading heads for mixing at least a first component of the video signal read from the magnetic recording tape by the at least one read head with a second video signal from a video signal source, the mixing circuit being operatively connected with at least one of the recording heads for supplying the mixed video signal to at least one of the recording heads to be recorded on the magnetic tape.

2. The apparatus as set forth in claim 1 further including a reproducing circuit connected with the first and second reading heads for processing first and second video signal components read from the magnetic tape by the first and second reading heads to produce an output video signal, the reproducing circuit being connected with the mixing circuit to supply the first video signal component to the mixing circuit, the mixing circuit being connected with the first recording head.

3. A magnetic tape recording and playback apparatus comprising:
   at least first and second recording heads for recording a video signal in slant tracks on a magnetic tape, the first and second recording heads being mounted on a rotary cylinder in a first plane which is generally transverse to an axis of the rotary cylinder, the first recording head having a first azimuthal angle and the second recording head having a second azimuthal angle;
   at least first and second reading heads for reading first and second components of the video signal recorded on the magnetic tape, the reading heads being mounted on the rotary cylinder in a second plane parallel to and displaced axially from the first plane, the first reading head having the first azimuthal angle and the second reading head having the second azimuthal angle;
   a reproducing circuit connected to the reading heads (i) for processing the first and second video signal components read from the magnetic tape by the first and second reading heads into an output video signal and supply the output video signal to a video signal output and (ii) for providing the first video signal component to a first video signal component output;
   a video signal input for receiving an input signal from a video signal source;
   a mixing circuit connected with the video signal input and the first video signal component output for mixing the first video signal component and the input video signal to generate a mixed signal; and,
   a circuit for supplying the mixed video signal to the first recording head.

* * * * *